United States Patent
Roberts et al.

(10) Patent No.: US 7,603,559 B2
(45) Date of Patent: Oct. 13, 2009

(54) REAL-TIME SIGNATURE EMBEDDING IN VIDEO

(75) Inventors: David Keith Roberts, Crawley (GB); Jan Klijn, Eindhoven (NL); Johan Leon Schirris, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 200 days.

(21) Appl. No.: 10/518,270

(22) PCT Filed: Jun. 12, 2003

(86) PCT No.: PCT/IB03/02626

§ 371 (c)(1),
(2), (4) Date: Dec. 16, 2004

(87) PCT Pub. No.: WO04/002131

PCT Pub. Date: Dec. 31, 2003

(65) Prior Publication Data

US 2005/0232417 A1    Oct. 20, 2005

(30) Foreign Application Priority Data

Jun. 24, 2002   (EP)  ................................. 02077500

(51) Int. Cl.
*H04L 9/32*     (2006.01)
*H04N 7/16*     (2006.01)
*G06F 7/04*     (2006.01)
*G06F 17/30*    (2006.01)
*H04N 7/167*    (2006.01)

(52) U.S. Cl. ........................ 713/176; 380/201; 725/25; 726/2; 726/26

(58) Field of Classification Search .................. 713/176; 382/100
See application file for complete search history.

(56) References Cited

U.S. PATENT DOCUMENTS 5,373,323 A * 12/1994 Kwon .......................... 348/448

(Continued)

FOREIGN PATENT DOCUMENTS

WO     WO 9811492 A1 *   3/1998

OTHER PUBLICATIONS

"MPEG-4: An Object-based Multimedia Coding Standard Supporting Mobile Applications," Atul et al., Mobile Networks and Applications vol. 3 Issue 1 pp. 5-32 Jun. 1998.*

(Continued)

*Primary Examiner*—Nasser G Moazzami
*Assistant Examiner*—Oscar A Louie (57) ABSTRACT

A method and system for embedding an authentication signature in an audio-visual signal such that only a part of an entire frame of the audio-visual signal is stored in a memory while the signature bits are calculated and the watermark is embedded. A signature is formed based on a first portion of said audio-visual signal, whereby said first portion is a pattern of horizontal lines of said audio-visual signal and has fewer lines than the number of lines of the entire audio-visual signal. Thereafter the signature generated is embedded in said audio-visual signal in the first portion and/or in another portion of the frame to be authenticated, whereby the other portion also is a pattern of horizontal lines. Thus only memory for some lines instead for all lines of the audio-visual signal is needed. In the case of an interlaced audio-visual signal, the first portion is preferably the first field of a frame of said audio-visual signal and the second portion is the second field of said audio-visual signal. In the case of a non-interlaced audio-visual signal, slices of said lines are preferably used for said portions.

17 Claims, 5 Drawing Sheets

U.S. PATENT DOCUMENTS

| | | | | |
|---|---|---|---|---|
| 5,632,038 | A * | 5/1997 | Fuller | 713/324 |
| 5,790,110 | A * | 8/1998 | Baker et al. | 345/547 |
| 5,809,139 | A * | 9/1998 | Girod et al. | 380/202 |
| 5,822,432 | A * | 10/1998 | Moskowitz et al. | 380/28 |
| 5,907,619 | A * | 5/1999 | Davis | 713/176 |
| 5,960,081 | A * | 9/1999 | Vynne et al. | 713/176 |
| 5,963,909 | A * | 10/1999 | Warren et al. | 705/1 |
| 6,009,176 | A * | 12/1999 | Gennaro et al. | 713/170 |
| 6,037,984 | A * | 3/2000 | Isnardi et al. | 375/240.21 |
| 6,211,919 | B1 | 4/2001 | Zink et al. | 348/473 |
| 6,240,121 | B1 * | 5/2001 | Senoh | 375/130 |
| 6,850,619 | B1 * | 2/2005 | Hirai | 380/203 |
| 7,020,285 | B1 * | 3/2006 | Kirovski et al. | 380/238 |
| 7,113,612 | B2 * | 9/2006 | Sugahara et al. | 382/100 |
| 7,171,017 | B2 * | 1/2007 | Keating et al. | 382/100 |

OTHER PUBLICATIONS

M. Barni et al; "Digital Watermarking for the Authentication of AVS Data", Signal Processing X Theories and Appl. Proceedings of Eusipco 2000, Tenth European Signal Processing Tempere, Finland Sep. 4-8, 2000; pp. 1037-1040; vol. 2; XP002252814.

J. Fridrich; "Image Watermarking for Tamper Detection". Proceedings 1998 Int. Conf. on Image Processing, ICIP98 (Cat. No. 98CB36269), Conf. on Image Processing, Chicago, IL, Oct. 4-7, 1998, pp. 404-408, vol. 2, XP010308634.

J. Fridrich; "Methods for Tamper Detection in Digital Images", Proceedings of IEEE Worksop on ISPACS, 1999, pp. 1-6, XP002952952.

* cited by examiner

REAL-TIME SIGNATURE EMBEDDING IN VIDEO

FIELD OF THE INVENTION

This invention relates in general to the field of signal authentication and more particularly to the embedding of signatures in an audio-visual signal for authentication of images and video.

BACKGROUND OF THE INVENTION

Figure 1:
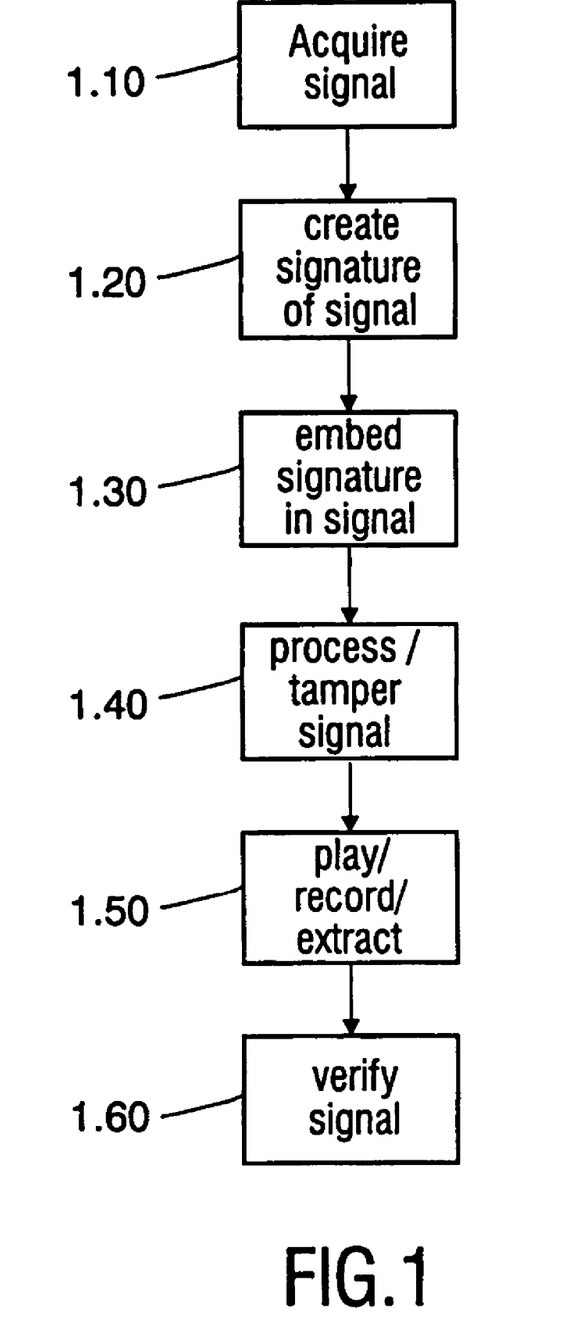
FIG. 1 shows a Prior Art authentication system.

The success of digital imaging and video has lead to a wide use of this technology in many fields of everyday life. Technology to edit, alter or modify digital images or video sequences is commercially available and allows modifications of the contents of said images or videos without leaving traces. For a variety of applications, such as evidential imaging in law enforcement e.g. from security cameras, medical documentation, damage assessment for insurance purposes, etc., it is necessary to ensure that an image or video has not been modified and is congruent with the image or video originally taken. This led to the development of signal authentication systems for which an example is shown in FIG. 1, wherein a signature is created at 1.20 for an audio-visual signal, such as an image or video, which is acquired in 1.10. The signature is embedded e.g. as a watermark in 1.30 into the signal. Thereafter the signal is processed or tampered in 1.40, played, recorded or extracted in 1.50 and finally verified in 1.60 in order to either ensure that the authenticity of the signal is proven or that modifications of the signal are revealed.

Embedding data into a video-signal is known from U.S. Pat. 6,211,919 wherein an analogue video signal is converted to a digital video signal into which data is embedded and then converted back to an analogue video signal. Error correction across frames is implemented in order to compensate for transmission losses. The solution disclosed therein is of complex technical nature requiring large buffer memories for storing the entire frame or several frames of the video signal. These memories are expensive and it is therefore desired to minimize the amount of memory needed.

Furthermore, especially for the above mentioned applications of authenticating signatures, it is important that each video frame possesses the capability to authenticate itself, because in e.g. the above mentioned security camera application, not all frames of a sequence are stored, e.g. only every fiftieth frame, likewise for medical imaging, perhaps only a subset of images are retained. In general it is not known which frame will be recorded and which will be discarded. Consequently, all information required to authenticate a certain frame of a video sequence must be available in and derivable from the frame itself. This is not possible, when a frame has a dependency on preceding or subsequent frames, as in the above document, in order to enable authentication of the frame.

The signature calculation and embedding has to take place as soon as possible after the generation of the video signal in order to prevent the video being tampered before authentication information is stored in it. Therefore it is an advantage if the signature calculation and embedding is placed close to the image capturing device, e.g. inside a security camera, and the signature calculation and embedding takes place in real-time on the video stream generated. Today's solutions, as disclosed in the above document, are technically complicated and expensive.

Finally, according to the prior art, in order to embedded the signature bits calculated in 1.20 for an audio-visual signal, such as a digital image, inside the audio-visual signal itself as a watermark in 1.30, an entire frame of the audio-visual signal has to be buffered in a large, expensive memory while the signature bits for the frame of said audio-visual signal are calculated, the watermark having the signature bits as a payload is constructed, and finally said watermark is embedded inside said frame of the audio-visual signal. This renders such solutions expensive due to the amount of expensive memory needed.

Thus, the problem to be solved by the invention is defined as how to provide low-cost real-time generation of an audio-visual signal with self-authenticating frames.

SUMMARY OF THE INVENTION

The present invention overcomes the above-identified deficiencies in the art and solves the above problem by embedding a signature in an audio-visual signal, such as a video signal or a digital image, in a way that completely obviates the need to buffer an entire frame of the audio-visual signal in a large memory while the signature bits are calculated and the watermark is embedded, thus dramatically reducing the cost of the memory needed, according to the appended independent claims.

According to embodiments of the invention, a method, an apparatus, and a computer-readable medium for authenticating an audio-visual signal are disclosed. According to these embodiments, a signature is formed based on a first portion of a frame of said audio-visual signal. Thereafter the signature formed is embedded in said audio-visual signal in said first portion or at least in a second portion of the frame to be authenticated whereby said portions are patterns of horizontal lines of said audio-visual signal and have fewer lines than the total number of lines of the entire audio-visual signal.

Thus a real-time low-cost solution, is proposed needing only memory for some lines of the audio-visual signal instead for memories storing entire frames of the audio-visual signal. All information required to authenticate the frame is put into the frame itself, rendering each frame self-authenticating.

These and other aspects of the invention will be apparent from and elucidated with reference to the embodiments described hereafter.

BRIEF DESCRIPTION OF THE DRAWINGS

Preferred embodiments of the present invention will be described in the following detailed disclosure, reference being made to the accompanying drawings, in which.

DESCRIPTION OF PREFERRED EMBODIMENTS

A video signal, although representing a 2D image, is transmitted and handled as a one-dimensional signal by scanning the image line by line. Analogue or digital video is classified into interlaced and non-interlaced, also called progressive scan, video. For example video signals according to the NTSC, PAL and SECAM standard are interlaced and most PC displays are non-interlaced, whereas HDTV (High Definition Television) signals can be either interlaced in higher resolution modes or non-interlaced in lower resolution modes.

Interlaced audio-visual signals, such as video, are defined in that each frame of said signals consists of two fields, whereby each field is a particular division of said frame and contains every other horizontal line in the frame. When handling an interlaced video by e.g. transmitting or displaying it, the field containing all the odd lines, inclusive the topmost scan line, is handled first and called the upper field; the field containing the even lines is called the lower field and is handled consecutively to create a single frame or complete image. Thus, for an interlaced signal lines 1, 3, 5, . . . (i.e. all of the first field) are handled first, then lines 2, 4, 6, . . . (i.e. all of the second field) are handled. Each field can be subdivided into segments of consecutive lines of said frame, so called slices, e.g. slices of three lines: [1, 3, 5], [7, 9, 11], [2, 4, 6] or [8, 10, 12]. A special case of slices of consecutive lines in an interlaced signal is when the first slice comprises all odd or even lines of a frame and the other slice the remaining even or odd lines of the frame.

Non-interlaced video displays each line of a frame in order, whereby a frame is defined as a complete image in a sequence of images constructing a video. Thus, for a non-interlaced signal lines 1, 2, 3, . . . (i.e. all lines of the frame) are handled. Such a frame can be subdivided into slices of consecutive lines e.g. slices of three lines: [1, 2, 3] or [4, 5, 6].

Interlaced and Non-Interlaced video refers to capturing, transmitting and displaying video sequences.

A portion of a frame is defined as an individual share of said frame being part of said frame, e.g. a slice or a field as defined above.

A region of a frame of an audio-visual signal, such as a digital image in a video stream, is defined as a spatial region within said frame, e.g. the top, the centre, the bottom.

Figure 2:
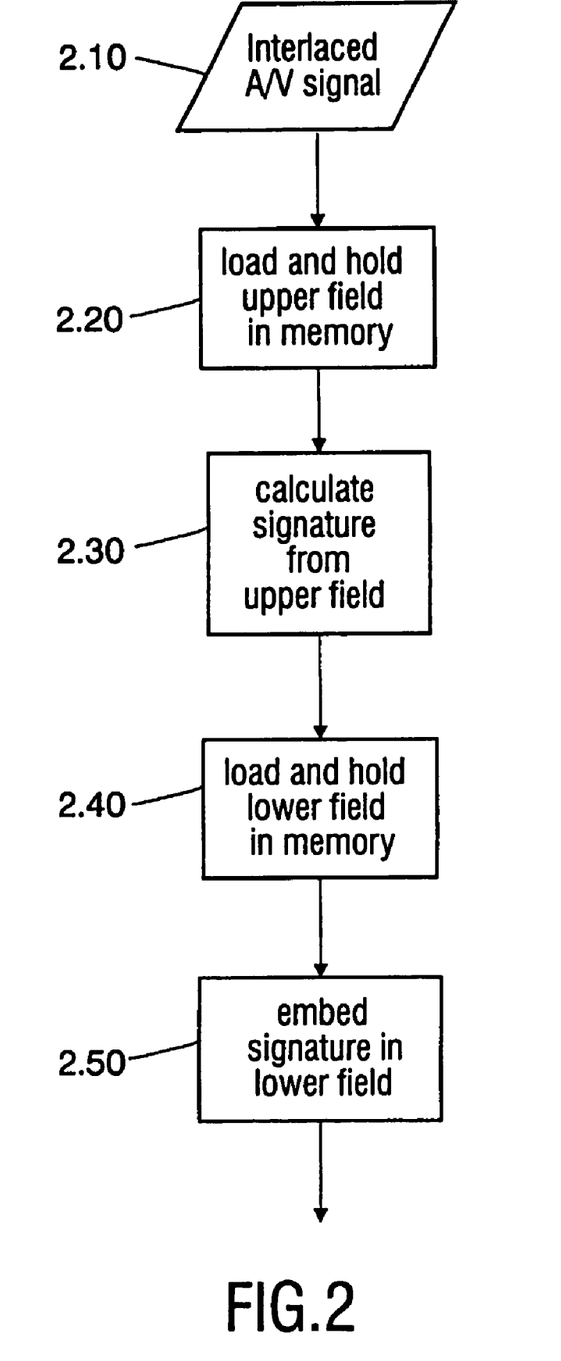
FIG. 2 shows an embodiment of the invention.

FIG. 2 shows an embodiment of the invention, wherein an audio-visual signal, captured in step 2.10 is interlaced. The upper field of a frame in the interlaced audio-visual signal, e.g. consisting of n lines, is assigned to a first portion, loaded and held in a memory circuit in step 2.20. A signature of the first field is calculated in step 2.30, whereby said signature comprises information for authenticating all regions of the frame as the first field contains all image content, albeit only alternating lines thereof. Subsequently the lower field of the same frame in the audio-visual signal, e.g. consisting of m lines, is assigned to a second field in step 2.40 and the second field is saved in the same memory circuit, replacing the first field in the memory circuit. Said memory circuit needs therefore to have maximally a capacity of m respectively n lines, preferably m or n line memories. Thus the memory requirements are limited to half the requirements of the prior art as discussed above. The signature bits of said signature need also to be saved for the next step 2.50, where the signature is embedded in the second field of said audio-visual signal being in said memory circuit. However, storage capacity for said signature bits is negligible compared with that required for storing pixels in an audio-visual signal such as video. The signature bits can e.g. be saved in the n-th line of memory as in practice the second field often comprises one line less than the first field, i.e. m=(n−1), depending on the frame size.

Figure 3:
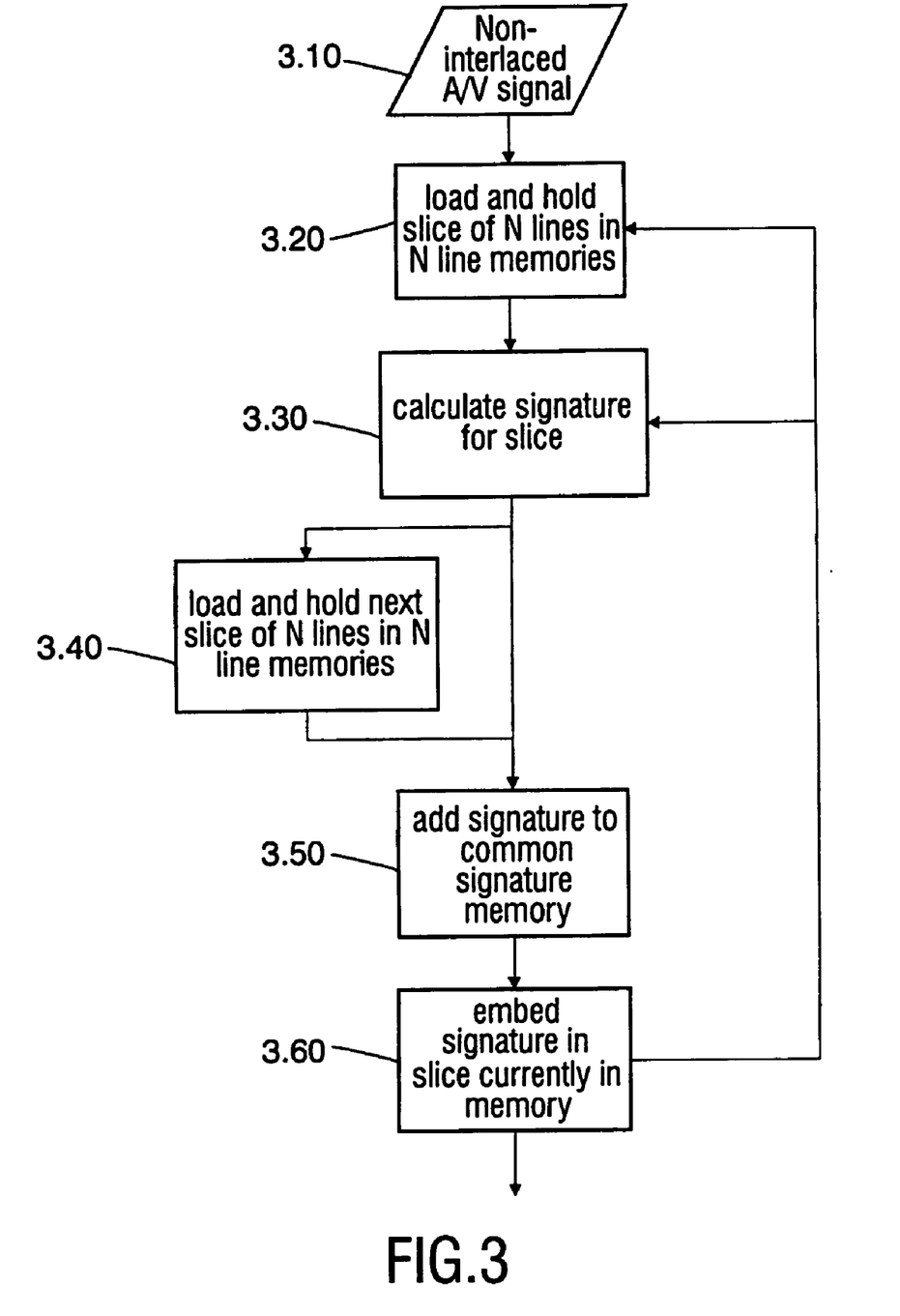
FIG. 3 shows another embodiment of the invention.

FIG. 3 illustrates another embodiment in which the audio-visual signal is non-interlaced, captured by progressive scanning in step 3.10. A slice of said audio-visual signal consisting of N horizontal lines is loaded into and hold in a memory circuit of sufficient capacity for said N lines, such as N line memories, in step 3.20. Then the signature is calculated for said slice in 3.30. In case the current signature is to be embedded in the current slice itself, step 3.50 will follow directly. In case the signature is to be embedded in the next consecutive slice, the next slice is now loaded into the N line memories, replacing the current slice. If the current slice is already the last slice in said frame, the signature can only be embedded in the current slice itself. In case, a common signature for all slices is to be embedded, the signature for the current slice is added to a common signature with respectively previously calculated slices' signatures in optional step 3.50. If the current signature is only to be embedded in the slice currently in the N line memories, it is not combined with previously calculated signatures. The signature is embedded into the slice currently in the N line memories in step 3.60. Subsequently the audio-visual signal is either further processed, e.g. by storing or transmitting, if signatures for all regions of the image have been calculated, i.e. signatures for all slices have been calculated, or the next slice is loaded into memory by returning to step 3.20, alternatively, if a new slice has been loaded into the N line memories in step 3.40, the signature is directly calculated in step 3.30, and so on. Storage of the signature bits calculated is similar to that described in the previous embodiment. This embodiment requires only holding a slice in memory therefore requires N line memories. While a particular slice is in memory it is possible to calculate the signature bits for that slice, and embed the signature into that slice, preferably as a watermark. The watermark can carry a payload consisting of the signature bits for the slice itself, plus any preceding slices' signature bits. Thus the i-th slice can be embedded with signature bits from slices 1 to i. The first slice can only be embedded with the signature bits of the first slice, and the last slice can be embedded with any or all of the signature bits from the entire frame of said audio-visual signal. Thus, the signature bits of the first slice may be embedded into any slice, preferably all slices, whilst the signature bits of the last slice are only embedded into the last slice itself Thus self-authentication of the image is maintained.

Figure 4:
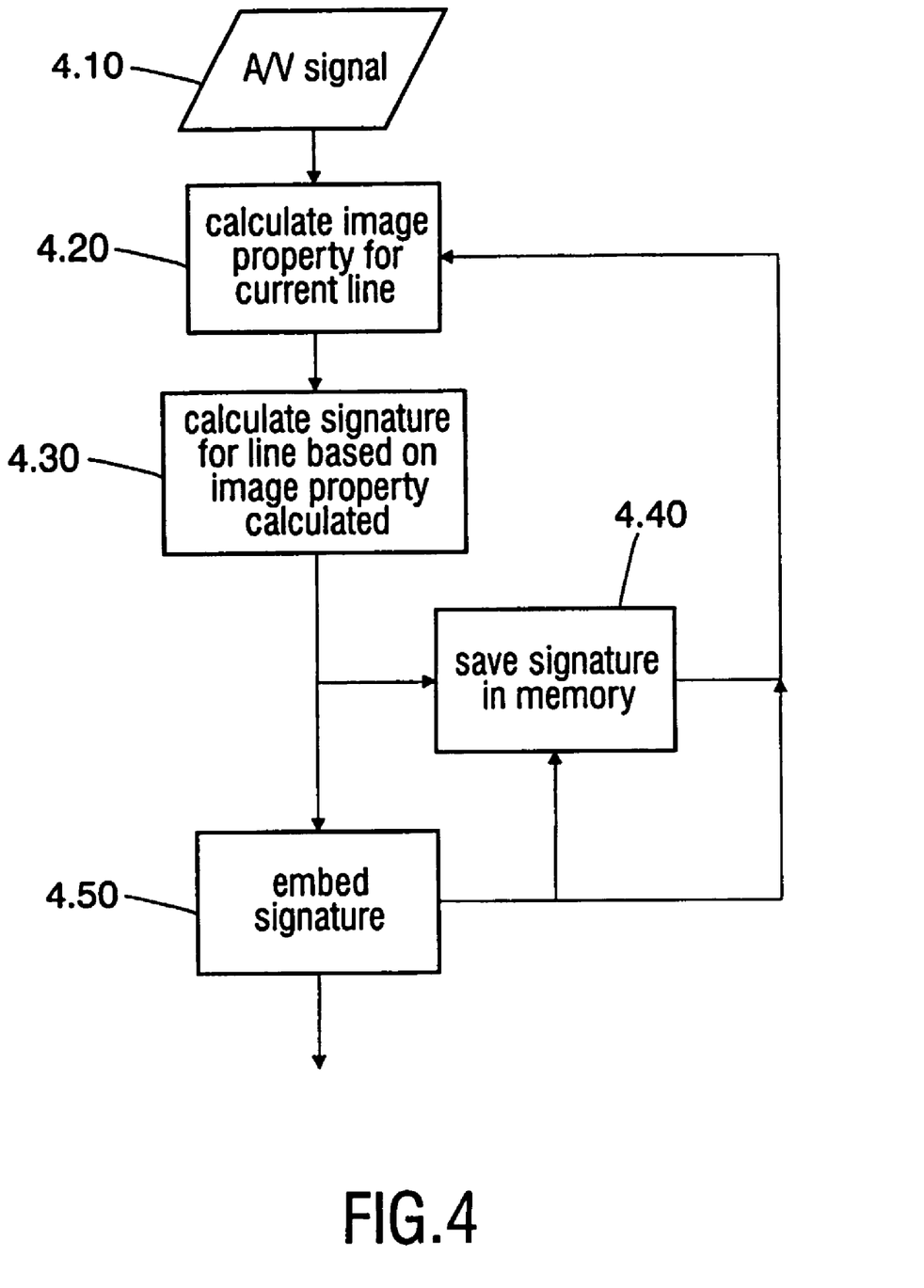
FIG. 4 shows a further embodiment of the invention.

In FIG. 4 a further embodiment of the invention is shown. An audio-visual signal is captured in step 4.10. As mentioned above, audio-visual signals are captured by scanning lines which have a certain position within a frame forming an image in a sequence of images/frames. In the current embodiment it is not distinguished between interlaced or non-interlaced signals. In step 4.20 the DC-value is calculated for the current line of said audio-visual signal and in step 4.30 signature bits are formed based on said DC-value of the current line. The signature bits calculated are either directly embedded in the current line itself in step 4.50 and calculation continues with the next line until signatures are calculated and embedded in all lines or the signature bits currently calculated are saved in memory in step 4.40 for later embedding in a subsequent line together with the signature bits for subsequent line(s) or the current signature bits, even in combination with signature bits calculated for previous lines, are both embedded in the current line and saved in memory for subsequent use. Thus, for inexpensive real-time operation a signature calculation scheme is shown which requires only a line memory, rather than the storage of an entire field as described in the first embodiment. The signature bit representing a given image area is calculated only from that area itself, and other nearby areas, which means one or some lines of the audio-visual signal treated by the invention. On top of this, the signature is based upon some image property, such as DC value, edges, moments, or histograms, which only requires computation and storing in memory of the property, not of the pixels. The memory requirements for calculating the signature are thus typically much less than a field memory, some line memories as in the above embodiment are sufficient, in certain cases even less memory is required, depending upon the property used. For example, calculating DC values is done by averaging, i.e. adding up the values of pixels of the audio-visual signal. In this case it is not necessary to store the pixel values themselves and the memory requirements are further minimized compared to the previous embodiments. Similarly for calculation of the watermark, once the payload is known, i.e. the complete signature is available, then forming the watermark can typically be done using only a few line memories because adapting the watermark to the image, in order to get the best trade between robustness and invisibility, involves looking at the image complexity, i.e. characteristics such as the amount of image activity in edges, texture etc., in localized areas around the watermarked pixel currently being calculated. This requires just a few line memories to hold the image pixels close by and the same line memories from above when in forming signature bits are used and no further memory circuits are necessary.

Figure 5:
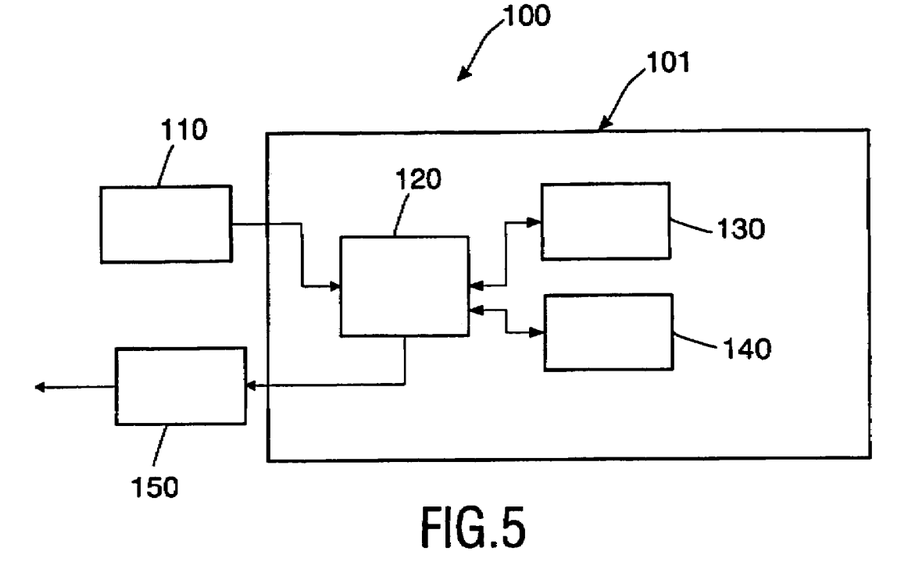
FIG. 5 illustrates an apparatus according to another embodiment of the invention.

FIG. 5 illustrates an embodiment of the invention in a system 100 for authenticating an audio-visual signal. An audio-visual signal is generated in 110. Preferably the audio-visual signal is captured in 110 by an image capturing device camera, such as a surveillance camera or a CCD array and/or an appropriate means for capturing the audio signal, such as a microphone. However, the audio-visual signal may also originate from a transmission signal, such as a video signal, or from a storage device, such as a harddisk drive or similar computer readable medium. The audio-visual signal is further processed in the apparatus 101 according to an embodiment of the invention. The audio-visual signal captured in 110 is fed into the apparatus 101. A slice of N lines of said audio-visual signal are stored and hold in memory 120. Memory 120 is built of N line-memories and comprises an additional memory for storing signature bits. The number N of lines is much lower than that of the entire audio-visual signal, an example is 3 line memories in means 120 for 480 horizontal lines in an audio-visual signal captured in 110. The extra memory needed for said signature bits is much lower than that for said lines, according to the discussion in the sections above. Means 130 communicates with said memory circuit 120 and calculates a signature for the lines in memory 120. The signature formed is based on the contents of the lines in memory 120. When the signature is formed, it is embedded in the lines still held in memory 120. The signature bits generated are saved in memory 120 for later use, such as embedding in subsequent slices of said audio-visual signal. The signature calculated is preferably embedded as a watermark, preferably a robust watermark, by means 140. A robust watermark is a watermark which is embedded in the audio-visual signal and which is not influenced by allowable image operations such as lossy compression. Subsequently said lines of said audio-visual signal with the signature embedded are fed out of apparatus 101 for further processing in 150. Subsequently the next N lines of the same frame of said audio-visual signal are loaded into memory 120, the signature is formed for the new line contents and embedded into the lines, preferably in combination with the signature bits previously calculated and saved in memory. The combined signature is also calculated by means 130. The above procedure is repeated until a signature has been calculated and embedded for all lines of a frame. Then memory contents in 120 are erased and a new frame generated in 110 is treated in 101.

Apparatus 101 is preferably implemented in the system 100 as a module, preferably comprising a microprocessor or similar electronic device such as a programmable array or similar electronic circuit.

Figure 6:
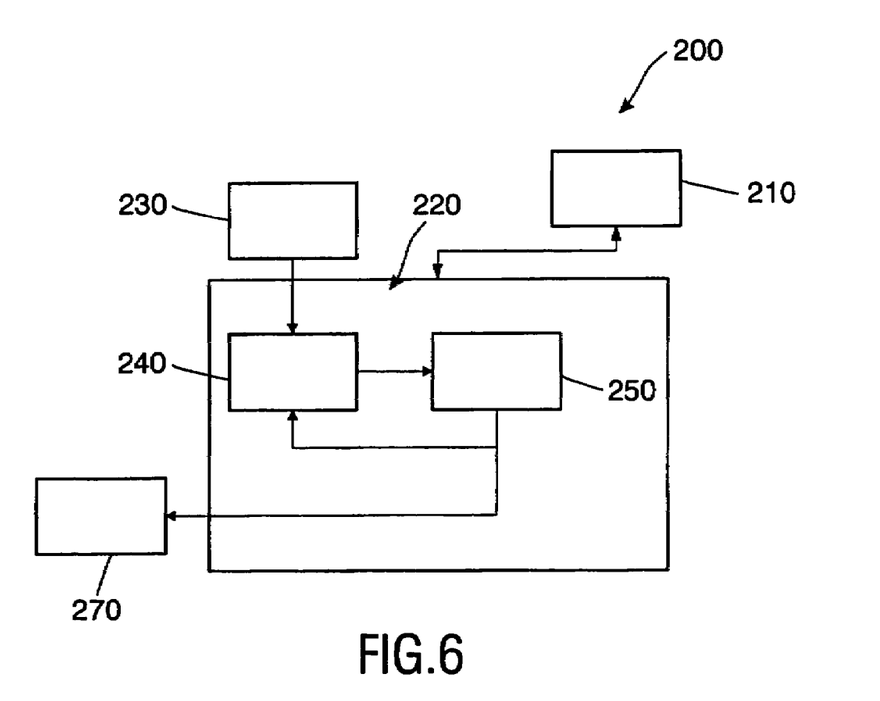
FIG. 6 illustrates a computer readable medium according to still another embodiment of the invention.

FIG. 6 illustrates another embodiment of the invention comprising a computer readable medium 220 in a system 200 for authenticating an audio-visual signal whereby an audio-visual signal is generated in 230. Preferably the audio-visual signal is captured in 230 by an image capturing device camera, such as a surveillance camera or a CCD array and/or an appropriate means for capturing the audio signal, such as a microphone. However, the audio-visual signal may also originate from a transmission signal, such as a video signal, or from a storage device, such as a harddisk drive or similar computer readable medium. A first program module 240 directs a computer 210 to form a signature for a slice of N lines of a frame of said audio-visual signal. In a second program module 250 said signature generated by the first program module is embedded in said slice of said frame of audio-visual signal, preferably as a watermark, more preferably as a robust watermark. The steps performed by program modules 240 and 250 are repeated with subsequent slices of lines of said frame until a signature has been calculated and embedded for the entire frame. Subsequently the audio-visual signal with the signature embedded is further processed, e.g. for authentication of the audio-visual signal, in 270.

In some applications of the invention, such as security imaging, only one of a plurality of frames, e.g. one frame in every 50 frames, is stored. It is therefore important that each frame is capable of authenticating itself without reference to preceding or subsequent frames. According to the invention the signature is embedded in the frame itself. The above method meets therefore this requirement as it treats each video frame as a separate still image. This also means that the method is equally applicable to both still images and video.

For security reasons, the signature calculation and embedding is placed as close as possible to the image capture device. This prevents the possibility of the audio-visual signal being tampered before the signature is calculated. Consequently the signature calculation and subsequent embedding, preferably as a watermark, preferably take place in real-time on the video stream generated inside an image-capturing device such as a camera. According to the invention, only a part of a whole frame of the video stream is stored in a memory. Therefore the method and apparatus according to the invention are well suited for real-time embedding of a signature. The person skilled in the art of signatures will therefore clearly use a type of signature generation which is adapted for real-time applications. However, the invention is not limited to a specific type of signature calculation.

In order to judge the authenticity of an image, a similar procedure to the signature formation is used, i.e. a signature is again calculated from a first portion of a frame of an audio-visual signal. In order to authenticate the contents of said portion, the original signature embedded in a portion of said frame is extracted and compared to the signature anew calculated for said portion, whereby the portion having embedded the original signature is not necessarily the same portion as for which the signature was originally calculated, e.g. the signature for lines 1,3,5 of a frame can be embedded in lines 13,15,17. Tampering is detected when the two signatures differ from each other. In case tampering is detected, an analysis of the modification is undertaken, if it is desired to e.g. localize where in the contents of said frame tampering has occurred, depending on the information derivable from the signature embedded.

Applications and use of the above described signal authentication according to the invention are various and include exemplary fields such as security cameras or surveillance cameras, such as for law enforcement, evidential imaging or fingerprints, health care systems such as telemedicine systems, medical scanners, and patient documentation, insurance documentation applications such as car insurance, property insurance and health insurance.

The present invention has been described above with reference to specific embodiments. However, other embodiments than the preferred above are equally possible within the scope of the appended claims, e.g. different field patterns than those described above, performing the above method by hardware or software, combining features from the embodiments such as e.g. forming slices within fields for interlaced content of audio-visual signals, or embedding signatures in interlaced content using some line memories, etc.

Furthermore, the term "comprising" does not exclude other elements or steps, the terms "a" and "an" do not exclude a plurality and a single processor or other unit may fulfil the functions of several of the units or circuits recited in the claims.

The invention claimed is:

1. An apparatus comprising:
    an input into which an audio-visual signal is fed from a capture device, said signal being comprised of a plurality of sequential frames, each of said plurality of sequential frames being comprised of at least first and second frames portions;
    a memory connected with the input for sequential storing each of the at least first and second frames portions of each of the frames of said audio-visual signal, thereby allowing for a reduced memory requirement relative to storing an entire frame of said audio-visual signal;
    a processor programmed to perform the step of:
        calculating a signature based on a first portion of said frame of said audio-visual signal currently stored in the memory,
        embedding the signature calculated based on the first frame portion in the second frame portion stored in the memory subsequently to the first frame portion such that the signature is frame from which it is calculated,
        while the second frame portion is stored in said memory, calculating a signature based on the second frame portion for embedding in a subsequent frame portion to be stored in the memory subsequent to the second frame portion; and
    an output from which the frames with the embedded signature are outputted.

2. The apparatus according to claim 1, wherein said first and second frame portions comprise patterns of horizontal lines of said audio-visual signal, said patterns having fewer lines than the entire audio-visual signal.

3. The apparatus according to claim 1, wherein the capture device includes a camera.

4. The apparatus according to claim 3, wherein the camera is a medical imaging camera.

5. A method of embedding a signature in an audio-visual signal for authentication of said audio-visual signal, said signal being comprised of a plurality of sequential frames, each of said plurality of sequential frames being comprised of at least two frames portions, the method comprising the step of:
    loading a first frame portion of a frame of said audio-visual signal in a buffer memory, thereby allowing for a reduced memory requirement relative to storing an entire frame of said audio-visual signal,
    calculating a signature based on an image property including at least one of DC value, edges, or moments and based on the first frame portion of said frame of said audio-visual signal,
    loading a second frame portion of the frame replacing the first frame portion in the buffer memory, the reduced memory requirement being equal in size to a larger of the first frame portion or the second frame portion,
    embedding the signature in the second frame portion of the frame such that the signature is embedded in a different portion of the frame than a portion of the frame from which the signature is calculated.

6. The method according to claim 5, wherein said at least two frame portions of said frame of said audio-visual signal respectively comprise patterns of horizontal lines of said audio-visual signal frame.

7. The method according to claim 5, wherein said steps of calculating and embedding are repeated until a said signature is embedded for all regions of said frame.

8. The method according to claim 5, wherein said audio-visual signal is an interlaced signal and said first portion comprises one of all even or odd lines and said second portion comprises all remaining odd or even lines not included in said first portion.

9. The method according to claim 5 whereby said audio-visual signal is a non-interlaced signal and said first and second frame portions comprise consecutive slices of said audio-visual signal, wherein each of said consecutive slices are further comprised of a group of consecutive lines of said frame.

10. The method according to claim 5, wherein the embedded signature comprises a watermark.

11. The method according to claim 10 whereby the watermark is embedded as a spread spectrum watermark.

12. The method according to claim 10, whereby the watermark is embedded in a different portion of said frame than the portion of said frame for which said signature is generated.

13. The method according to claim 5 wherein the steps of calculating and embedding said signature are performed in real-time.

14. The method according to claim 5, wherein the first and second portions are selected based on said audio-visual signal being one of an interlaced or a non-interlaced signal.

15. The method according to claim 14, wherein said audio-visual signal is said interlaced signal, said first portion comprising odd lines of the frame of said audio-visual signal and said second portion comprising even lines of the frame of the audio-visual signal.

16. The method according to claim 14, wherein said first and second portions each comprise a pattern of horizontal lines of said audio-visual signal, each of said patterns of consecutive horizontal lines having fewer lines than the entire audio-visual signal.

17. The method according to claim 14, wherein said audio-visual signal is said non-interlaced signal, said first portion comprising an upper half of said frame of said audio-visual signal and said second portion comprising a lower half of said single frame in the case.

* * * * *